Patented Aug. 13, 1946

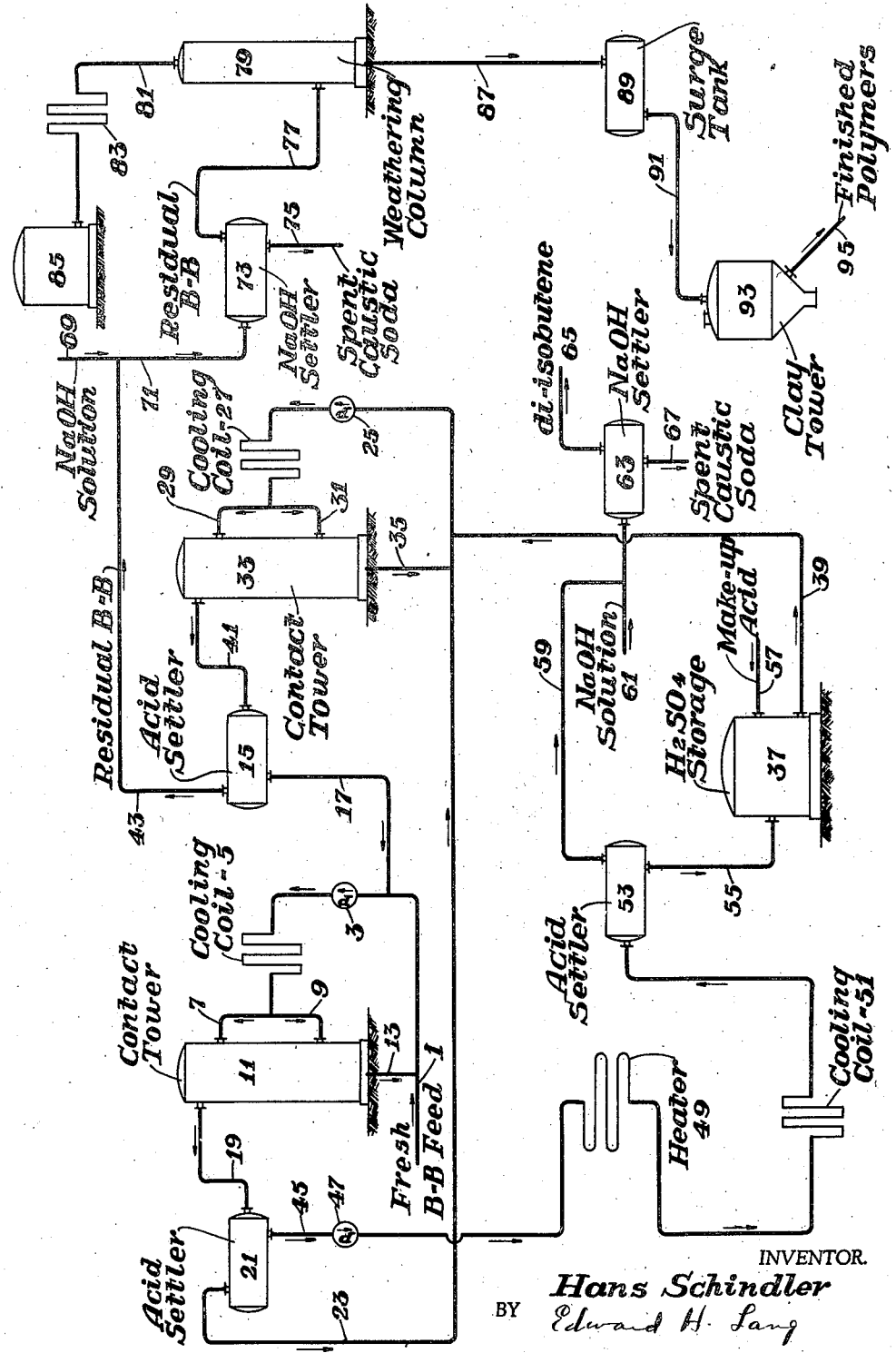

2,405,905

UNITED STATES PATENT OFFICE 2,405,905

REMOVAL OF SULPHUR COMPOUNDS FROM HYDROCARBON POLYMERS

Hans Schindler, Evanston, Ill., assignor to The Pure Oil Company, Chicago, Ill., a corporation of Ohio Application August 6, 1943, Serial No. 497,622

5 Claims. (Cl. 260—677)

This invention is directed to the problem of removing sulphur compounds from liquid hydrocarbons and more particularly to the removal of sulphur compounds from polymers formed during polymerization of C-4 olefins in the presence of sulphuric acid.

There is in commercial operation a process for preparing di-isobutene by absorption of isobutene in sulphuric acid, followed by heating of the fat acid to a temperature at which the absorbed isobutene polymerizes to di-isobutene and to a lesser extent, to higher boiling polymers. In the so-called cold acid process a C-4 fraction composed of n-butane, isobutane, n-butene and isobutene, known as B-B cut and obtained by the stabilization of cracked gasoline, is contacted with sulphuric acid of approximately 65-70% concentration at temperatures of 20-45° C. at a pressure of 100 to 200 pounds per square inch for a period of time of approximately 10 minutes with a hydrocarbon to acid ratio of from 1 of the former to 4 of the latter, to from 4 of the former to 1 of the latter, and preferably at a ratio of about 1 to 1. Under these conditions isobutene is selectively absorbed in the acid, and if conditions are carefully controlled substantially no n-butenes will be absorbed in the acid. The fat acid is then heated to a temperature of approximately 200 to 230° F. under a pressure of 150 pounds per square inch or higher for approximately 20 minutes, in order to convert the absorbed isobutene to di-isobutene. The resulting polymer can readily be separated from the acid and may be utilized per se as motor fuel or may be hydrogenated to make iso-octane.

In the operation just described the residual B-B cut not absorbed in the acid is recovered for use as blending stock for gasoline, or for use as a base stock in the manufacture of butadiene and for other purposes. The residual B-B is recovered from the process in liquid state and carries in solution a small amount of polymer which may vary from 5 to 10% by volume of the residual B-B. This polymer is separated from the residual B-B by weathering or fractionation. The invention in this application resides in the treatment of the polymers separated from the residual B-B in order to remove sulphur therefrom.

It has been found that the polymer separated from the residual B-B from the acid polymerization of isobutene to di-isobutene has a rather high sulphur content, which is objectionable, among other reasons, because it decreases the lead susceptibility of the polymer and of gasoline stock with which it is blended. I have found that the sulphur in the polymer separated from the residual B-B can be readily removed by contacting the polymer with silica gel, fuller's earth or other similar adsorptive clays, both of the natural and synthetic types.

In order to make my invention more easily understood reference is made to the accompanying drawing, which is a diagrammatic flow-sheet of the various steps involved in producing the finished polymer in accordance with my invention.

Numeral 1 indicates a line through which fresh B-B cut is fed to the acid absorption and polymerization plant. As previously stated the fresh B-B may be the over-head from the stabilization of thermal and/or catalytically cracked gasoline. Fresh B-B is pumped by means of pump 3 through cooler 5, where the temperature is lowered to approximately 20 to 45° C. and then charged through the lines 7 and 9 into contact tower 11. The fresh B-B before being pumped through cooler 5 into the contact tower 11 is mixed with a portion of the acid withdrawn from contact tower 11 through line 13, and is further mixed with partially saturated acid withdrawn from acid settler 15 through line 17.

Acid containing absorbed isobutene and unabsorbed B-B are withdrawn from the top of tower 11 through line 19, and passed to acid settler 21, where the unabsorbed B-B fraction is separated from the fat acid. The pressure on the system is sufficient to maintain the B-B cut in liquid phase.

The B-B cut partially denuded of its isobutenes is withdrawn from acid settler 21 through line 23 and charged by means of pump 25 through cooling coil 27 and lines 29 and 31 into a second contact tower 33. Before the B-B cut enters the cooling coil 27 it is mixed with acid from the bottom of contact tower 33 withdrawn through line 35 and with acid withdrawn from storage vessel 37 through line 39. In the second tower 33 a further portion of the isobutene content of the B-B cut is absorbed in the acid. The fat acid and unabsorbed B-B are withdrawn from tower 33 through line 41 to acid settler 15. In acid settler 15 the residual B-B separates from the fat acid and is withdrawn through line 43.

Fat acid from acid settler 21 is withdrawn through line 45 and pumped by means of pump 47 through heater 49 at a pressure of 150 pounds per square inch or higher. In heater 49 the temperature of the fat acid is raised to approximately 200 to 230° F. at which temperature the absorbed isobutene polymerizes mainly to di-isobutenes and to a lesser extent to tri-isobutene. The hot polymer-acid mixture is then cooled in cooling coil 51 to approximately atmospheric temperature and then passed to acid settler 53 where the polymer separates from the acid. The acid is withdrawn through line 55 to storage vessel 37 to be reused in the process. Make-up acid may be added through line 57.

The di-isobutene polymer is withdrawn from acid settler 53 through line 59 and mixed with sufficient aqueous caustic soda solution from line 61 to neutralize any remaining acid. The polymer-caustic soda mixture passes to caustic soda settler 63 where the caustic soda solution separates from the di-isobutene polymer. Di-isobutene is withdrawn from the settler through line 65 and passes to storage. The spent caustic is withdrawn from settler 63 through line 67.

Residual B-B withdrawn through line 43 is mixed with sufficient caustic soda solution from line 69 to neutralize the acid content thereof. The residual B-B caustic soda mixture passes through line 71 to caustic soda settler 73 where the aqueous solutions separates from the residual B-B. Spent caustic is withdrawn from the settler through line 75 and the neutralized residual B-B is withdrawn through line 77 from which it may pass to weathering column 79 where it is fractionated and taken overhead through line 81 and condenser 83 to collecting vessel 85. Polymer which was dissolved in the residual B-B cut remains as residue in the bottom of the weathering column 79 and is withdrawn therefrom at a temperature of approximately 270° F. and at a pressure of 75 pounds per square inch through line 87 to accumulator or surge tank 89 and from there charged through line 91 to clay tower 93 where it is percolated through a bed of clay either of the natural or synthetic variety, or silica gel. Finished polymer is withdrawn from the clay tower through line 95. Any clay that has good adsorptive properties, such as fuller's earth, is suitable. The polymer is percolated through the clay tower until the sulphur content of the effluent polymer is above the maximum allowed. The polymer is then switched to a stand-by active clay tower and the spent clay tower is regenerated by steaming and blowing with air at elevated temperature or in any other conventional manner.

Adsorptive clay or silica gel will effectively remove the sulphur compounds at atmospheric temperature as well as temperatures somewhat above atmospheric. Although the polymers leave the bottom of the weathering tower at approximately 270° F. it is not necessary to cool them prior to clay or silica gel percolation. Ordinarily the temperature will drop below the vaporization point of the polymers in tank 89. It may be advisable to operate the clay tower under sufficient pressure to insure against vaporization in the clay tower.

In order to determine the efficacy of silica gel and fuller's earth for removing sulphur compounds from polymer separated from residual B-B from a cold acid absorption and polymerization treatment, a sample of such polymer having an initial boiling point of 140° F. and an end point of 269° F. with a sulphur content of 0.81 percent by weight was percolated through silica gel. The sulphur content of the treated polymer was 0.002. A sample of the same polymer was percolated through fuller's earth of 30 to 60 mesh, which had been dried for 1 hour at 600° F. and the sulphur again was reduced to 0.002.

Further tests were made on silica gel and fuller's earth, in order to obtain data on yields. The following table gives the results obtained:

Table

| Filtering medium | Rate of percolation (bbls./ton/hour) | Temp., °F | Yield bbls./ton | Per cent sulphur | Hold-up of clay(bbls./ton) |
|---|---|---|---|---|---|
| Silica gel | 4.8 | 80 | 36.6 | 0.048 | 4.7 |
| Fuller's earth (dried at 600° F. for 2 hrs) | 4.8 | 80 | 15.5 | 0.054 | 6.9 |

Another run was made with fuller's earth which had not been dried and the sulphur content of the polymer was reduced to 0.07. A reduction in sulphur content to 0.08 percent or less is satisfactory.

It will be seen, therefore, that I have discovered a simple method for removing sulphur compounds from polymer formed in the cold acid polymerization of olefinic hydrocarbons.

It is claimed:

1. The process of recovering a hydrocarbon polymer suitable for use in gasoline comprising contacting an olefinic $C_4$ fraction, obtained in the stabilization of cracked gasoline, with 65–70% sulphuric acid at temperatures of 20–45° C. and at pressures sufficient to maintain said $C_4$ fraction in liquid phase, separating residual $C_4$ fraction from the reaction mixture, neutralizing free acid contained therein, fractionally distilling the neutralized fraction to separate polymer from lower boiling normally gaseous hydrocarbons and contacting said polymer with siliceous solid adsorptive material at temperatures below the vaporization temperature of said polymer.

2. Process in accordance with claim 1 in which the polymer is contacted with said siliceous solid adsorptive material by percolating the polymer therethrough.

3. Process in accordance with claim 1 in which the adsorptive material is silica gel.

4. Process in accordance with claim 1 in which the adsorptive material is fuller's earth.

5. Process in accordance with claim 1 in which the polymer is contacted with said siliceous solid adsorptive material at substantially atmospheric temperature and pressure.

HANS SCHINDLER.